US005104081A

United States Patent [19]

Sparks

[11] Patent Number: 5,104,081

[45] Date of Patent: Apr. 14, 1992

[54] DOUBLE MOUTH ORGAN HOLDER

[76] Inventor: Charles L. Sparks, 33145 Alaska Ct., Westland, Mich. 48185

[21] Appl. No.: 612,510

[22] Filed: Nov. 14, 1990

[51] Int. Cl.[5] .............................. F16M 11/00

[52] U.S. Cl. .............................. 248/229; 248/231.7; 248/316.4; 248/176

[58] Field of Search .............. 248/229, 185, 133, 137, 248/139, 141, 671, 176, 316.4, 316.6, 231.7, 231.4; 269/243, 249

[56] References Cited

U.S. PATENT DOCUMENTS 461,321 10/1891 Crouse .............................. 269/243 X
748,113 1/1933 Savelli .............................. 248/229
1,459,093 6/1923 French .............................. 269/249 X
2,510,198 6/1950 Tesmer .............................. 248/229

*Primary Examiner*—Alvin C. Chin-Shue
*Attorney, Agent, or Firm*—John P. Halvonik

[57] ABSTRACT

The invention relates to a harmomica holder that is designed to hold two harmonicas at the same time to the base of a guitar or other instrument. A swiveling arrangement holds the two harmonicas and permits them to be tuned by a thumbscrew that allows the user to change harmonicas (and thus the key) swiftly. By placing the holder on the guitar, the apparatus provides the musician with more freedom than the cumbersome, around-the-neck type of holders.

3 Claims, 1 Drawing Sheet

DOUBLE MOUTH ORGAN HOLDER

BACKGROUND OF THE INVENTION

1. Field of the Invention

The invention relates to the field of musical instruments, and in particular, to a harmonica holder that can be placed on the base of the guitar to hold one, two or more mouth organs (harmonicas) in a position above the guitar or other instrument. The invention provides a unique swiveling arrangement at the point where the harmonicas are held which enables one to change harmonicas by a simple turn of a thumbscrew which enables the musician to change harmonica keys very quickly and with little effort.

2. Description of the Prior Art

While there are harmonica holders that are used to support harmonicas on guitars, none that applicant is aware of can support a plurality of harmonicas and that enable the musician to change keys quickly through the use of a swiveling holder.

Conventional around-the-neck holders are annoying and may produce discomfort since they go around the user's neck. The swivel holder of the present invention may be attached to the base of a guitar or other instrument and permits the swiveling of the harmonicas that are attached, so that different keyed harmonicas may be used quickly and with little effort.

SUMMARY OF THE INVENTION

The harmonica holder of the present invention has an upper swiveling portion and a lower securing portion. The lower portion has a clamping portion that is designed to hold the holder to the guitar with a pair of holding clamps. The clamps comprise one or two nylon thumb screws that are threaded through one or two of the side wall portions of the lower piece (it is U shaped as is the upper piece) and hold the lower piece to the base of the guitar through a rubber pad that is affixed to the clamps.

The upper portion of the holder has a U shaped also. The upright portions of the U form side walls which have openings to permit a threaded shaft to go through. Thumbscrew are located at the ends of the threaded portions and are outside of the side walls. The threaded shafts are placed through the side walls and the ends of the shafts are secured into metal brackets on the inside of the side walls. The brackets have a channel that permits the side of a harmonica to be secured into a channel, each channel holds one side of each of the two harmonicas. A nut and washer arrangement between the sidewall of the upper portion and the outside of the channel (part of the bracket) secures the channels tightly against the harmonicas while the remaining portion of the threaded shaft which which is on the outside of the side wall of the holder remains movable. The thumbscrews swivel the pair of harmonicas so that a different one can be used by the musician. Thus, different keys can be played when one uses harmonicas with different keys in the holders.

It is the object of this invention to provide a harmonica holder that allows a musician to change keys quickly and easily.

Another objective of the invention is to provide a harmonica holder that can be attached to a guitar on the base.

Another objective is to provide a harmonica holder that allows the musician more freedom of movement.

Other advantages of the invention should be readily apparent to those skilled in the art once the invention has been described.

DESCRIPTION OF THE PREFERRED EMBODIMENT

Figure 1:
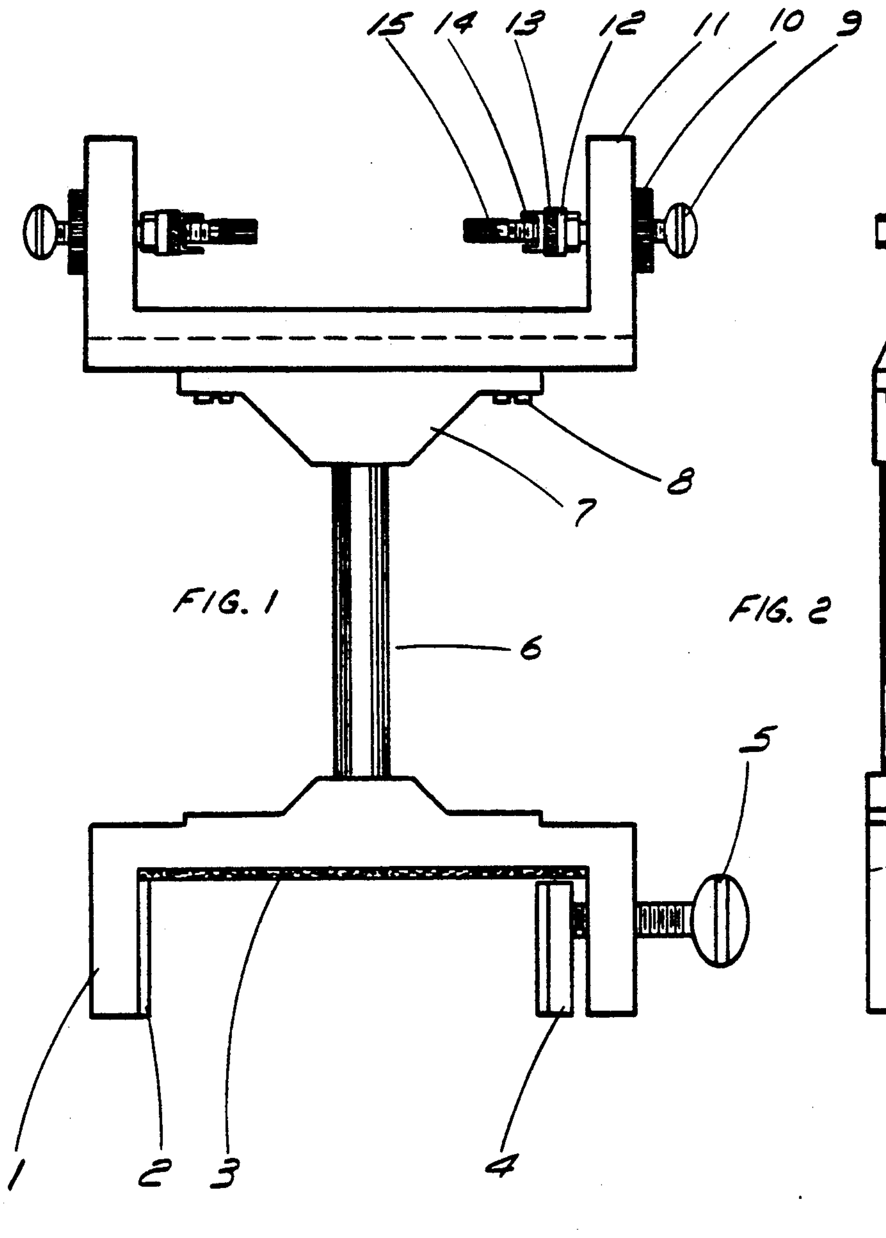
FIG. 1 shows the overall construction of the of the harmonica holder.
Figure 2:
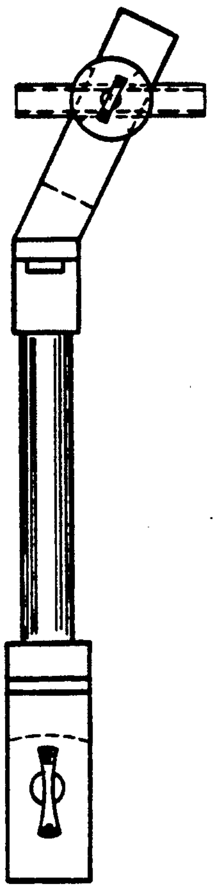
FIG. 2 shows a side view of the harmonica holder.

The harmonica holder is constructed as shown in FIG. 1. The upper portion 2 comprises a U shaped piece with sidewalls 4 that allow threaded screws 5 to fit through. The base portion of the U shaped piece may be attached to the lower portion 1 by various means. In the figure shown, a main screw 11 with threaded portions at each end connects the base of the upper portion to the other lower portion through threaded portions at each end of the main screw.

The upright portions of the U shaped upper piece form a pair of side wall portions 4 that have a pair of threaded bolts 5 going through. Those ends of the threaded bolts that are on the outside of the upright portions have thumb screws 6 which allow bolts and the bracket to be turned to thus rotate the pair of harmonicas 10. The ends 12 of the threaded bolts that are on the inside of the upright portions are secured into the brackets 8 (which should be threaded). The brackets contain a channel 7 in FIG. 4 that holds the harmonica.

Each of the channels (one on each bracket) are shaped to hold one end of each of the two harmonicas, see FIG. 3. Note that one bracket holds one side of each of two harmonicas (e.g. the left sides). The channels are specially shaped with a groove or channel 7 to hold the harmonicas sidewise (i.e. coplanar as shown), so that the blow holes face the user so that harmonicas may be used as the entire harmonica-bracket-screw assembly is rotated about the axis formed by the threaded screws. The channels are held tightly against the sides of the harmonicas through a nut and washer arrangement 9 between the channel and the side wall portion of the U shaped bracket. Tightening of the nut forces the channel against the side of the harmonica since the nut is threaded along the threaded bolt that goes through the side wall. The harmonicas may thus be locked into place along the channels. There is probably likely to be a limit on the number of turns the assembly can make due to the tightening of the nut and washers as the thumbscrews are turned, this would probably be about 1 and half turns in one direction. Of course this is no problem, simply turn in the other direction if the assembly won't turn.

Typically, one harmonica will be above and one will be below the inside end portion 12 of the bolt (which may be plastic tipped to avoid damage to the harmonicas) so that the harmonicas will look as if they are one on top of the other with a space separating them from actual contact. The arrangement of the harmonicas will be flat so that their sides with the blow holes will be in a position for use by the musician.

The tightening of the nut arrangement at the sides of the channels still allows the threaded portion to turn within the confines of the channel in the side of the side wall of the U shaped upper portion. By using the thumbscrews 6 on the outsides of the U-shaped bracket, the musician can rotate the bracket and harmonica assembly 180 degrees so that the other harmonica is in position to be used. It may be of a different key so that the musician can quickly change keys with very little trouble.

The bottom portion 1 of the holder may be attached to the upper portion through the main plastic post 11 (shown) which attaches both portions together. This allows the overall assembly to be quickly taken apart for ease of transport and storage. The lower portion is attached to the guitar through a similar threaded bolt and nut arrangement 3 going through one of the side walls, or pair going through both side walls. This allows the rubber pad 13 in FIG. 4 attached to the bolt to be tightly held against the base of the guitar or whatever instrument it is desired to attach the holder to.

The plate 13 that holds the lower portion against the guitar may be rubber to prevent damage. The inside portions of the threaded bolt 3 may be plastic tipped to also prevent damage. Many materials may be used in the construction of the holder, with nylon nuts and rubber washers preferred so that the holder may be light.

I claim:

1. An improved harmonica holder for supporting a pair of harmonicas on an instrument so that different keyed harmonicas may be used by a musician comprising: upper and lower portions, said lower portion comprising U shaped portion having side walls, said portion having lower attaching means for attaching said lower portion to an instrument, said upper portion having U-shaped holder, said U-shaped holder having left and right upper side walls with apertures, two threaded upper bolts positioned within said apertures, said threaded upper bolts having thumbscrews placed on those ends of the upper bolts that are on the outside of said upper side walls, said upper bolts having holding means for securing the sides of said harmonicas, two nut and washer combinations threaded on to said upper threaded bolts between said holding means and said side wall, said nut and washer combinations capable of tightening said holding means against the sides of said harmonicas so that said harmonicas may be tightly held and so that said thumbscrews can be turned to rotate said pair of harmonicas.

2. The apparatus of claim 1 wherein said lower attaching portion comprises a threaded aperture in one of said side walls of said U-shaped portion and a threaded bolt secured through said threaded aperture and capable of being tightened against said instrument.

3. The apparatus of claim 2 wherein said holding means comprise a bracket attached to the end of said upper bolt that is on the inside of said upper side wall and a channel attached to said bracket, said channel capable of attaching to the side edges of said harmonicas.

* * * * *